United States Patent
Hettich et al.

[11] Patent Number: 5,674,035
[45] Date of Patent: Oct. 7, 1997

[54] THREAD FORMING SCREW

[75] Inventors: Stefan Hettich, Schramberg-Sulgen; Ulrich Hettich, Schramberg, both of Germany

[73] Assignee: Ludwig Hettich Schraubenfabrik GmbH & Co., Schramberg-Sulgen, Germany

[21] Appl. No.: 537,936

[22] PCT Filed: May 2, 1994

[86] PCT No.: PCT/EP94/01382

§ 371 Date: Jan. 4, 1996

§ 102(e) Date: Jan. 4, 1996

[87] PCT Pub. No.: WO94/25763

PCT Pub. Date: Nov. 10, 1994

[30] Foreign Application Priority Data

May 4, 1993 [EP] European Pat. Off. .............. 93107217
Aug. 19, 1993 [EP] European Pat. Off. .............. 93113286

[51] Int. Cl.⁶ ........................ F16B 25/00; F16B 35/04
[52] U.S. Cl. .................... 411/386; 411/411; 411/418
[58] Field of Search ........................ 411/386, 411, 411/417, 418, 420, 421, 424

[56] References Cited

U.S. PATENT DOCUMENTS

| | | |
|---|---|---|
| 3,937,119 | 2/1976 | Ernst . |
| 3,965,793 | 6/1976 | Roser . |
| 4,439,077 | 3/1984 | Godsted ................................ 411/411 |
| 4,842,467 | 6/1989 | Armstrong ........................ 411/417 X |
| 5,044,853 | 9/1991 | Dicke ................................ 411/386 X |
| 5,061,136 | 10/1991 | Dixon et al. ...................... 411/386 X |
| 5,110,245 | 5/1992 | Hiroyuki .......................... 411/417 X |
| 5,190,426 | 3/1993 | Wieder et al. .................... 411/386 X |
| 5,531,553 | 7/1996 | Bickford .......................... 411/411 X |

FOREIGN PATENT DOCUMENTS

| | | |
|---|---|---|
| 0 433 484 A1 | 12/1989 | European Pat. Off. . |
| 520607 | 3/1931 | Germany . |
| 42 06 440 A1 | 2/1992 | Germany . |
| 651 115 A5 | 2/1983 | Switzerland . |

*Primary Examiner*—Neill R. Wilson
*Attorney, Agent, or Firm*—Rogers & Killeen

[57] ABSTRACT

A thread forming screw for concrete, masonry, rock, or similar material. The size ratios of various portions of the screw are defined to reduce thread engagement which, in turn, reduces screw-in torque. A burr in the screw's thread includes bow-shaped cutting teeth to facilitate screw-in.

20 Claims, 4 Drawing Sheets

THREAD FORMING SCREW

BACKGROUND OF THE INVENTION

A known screw of this kind (CH-A-651 115) has a thread having a ratio of the external diameter to the lead of about 2.5 and a profile angle in the range between 50° and 65°. In an embodiment, a ratio of approximately 1.3 is realized between the external diameter and the core diameter.

It is the object of the invention to devise a thread forming screw of the kind indicated in the preamble of claim 1 such that simple and reliable fixing of structural components to concrete or masonry will be possible without the use of dowels or other aids.

With the thread forming screw according to the invention the dimensioning parameters of the thread are selected such that little thread is in engagement so that the screw-in torque into hard material, such as concrete will not be excessive;

the distance between two turns of the thread is great enough to take into account the property of concrete of being able essentially to transmit thrust and only small tensile forces.

According to a further development of the invention, the shank of the screw has depressions at either side of the thread base to receive the concrete or rock flour which has broken away, something which is known per se for a different purpose in connection with a wood screw, namely to improve the retention.

Further dimensioning specifications are given regarding the lead p, the core diameter $d_k$, and the external diameter $d_a$ of the thread with respect to the diameter $d_b$ of the bore which is to be predrilled in the concrete or masonry. Claims 3 to 5 specify ranges of the parameters indicated within which the screw will provide optimum results as regards the screw-in torque and retention.

EP 89 123 699.4 discloses a thread forming screw, the thread burr of which has bow-shaped cutting teeth. The known screw has been devised to be screwed into wood or chipboard material. Surprisingly, using such cutting teeth also in case of the screw according to the invention results in much easier introduction of the screw into the brittle concrete which breaks away easily, and also into masonry or rock. An embodiment according to claim 7 is preferred in this respect.

Modifying the known screw according to EP 89 123 699.4, it is preferred with the screw of the invention for the recesses which define the cutting teeth to have a depth corresponding to from 5/7 to 7/7 of the thread height.

Concrete is a material with a tendency to form cracks. Now, in order to warrant sufficient load accommodating capacity of the screw also in case of cracks forming, e.g. due to local tensile stress under load of the screw, the features recited in claim 12 are provided in a preferred modification of the invention. The small angle of attack claimed, which provides an asymmetric shape of the thread cross section, prevents abrasive wear of the concrete in the zone of the crack due to relative movements between the thread flank at the side facing the screw head and the concrete.

The screw according to the invention also may be designed as a tool for forming a tapped hole in concrete, rock, masonry, or the like, as defined in claim 13. Then it is easy to introduce a screw having a thread according to claim 1 into the tapped hole formed with such a tool; in this event the screw may do without cutting teeth as claimed in claim 6 or 7.

Further modifications of the invention are indicated in the other subclaims.

BRIEF DESCRIPTION OF THE DRAWINGS

The invention will be described in greater detail below with reference to diagrammatic drawings of embodiments, in which.

DESCRIPTION OF PREFERRED EMBODIMENTS

Figure 1:
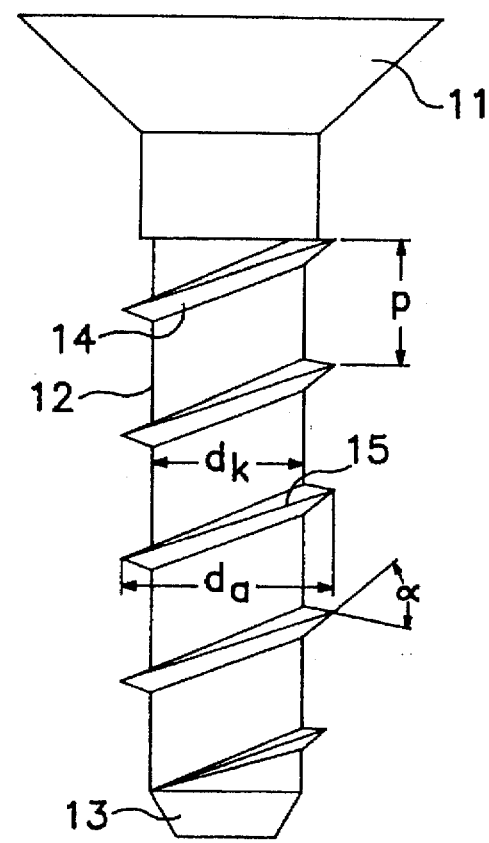
FIG. 1 is a side elevation of a screw according to the invention.
Figure 1:
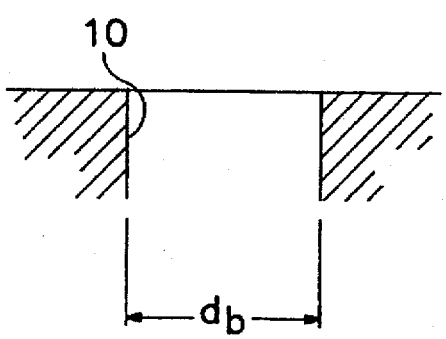

The screw illustrated in FIG. 1 comprises a screw head 11, a cylindrical screw shank 12, and a frustoconical screw tip 13 to facilitate insertion of the screw into a drilled hole 10.

A thread 14 extends throughout the length of the shank 12 up to the frustoconical end 13. 15 designates the thread burr, i.e. the continuous outer edge of the turns of the thread 14.

The following meanings apply in the description below:

$d_a$—external diameter, measured over the thread burr 15;

$d_k$—core diameter of the shank 12;

$d_b$—bore diameter of the predrilled bore 10;

P—lead between two threads of the screw;

$\alpha$—profile angle of the thread.

The dimensions indicated have the following relationships (1), (2), and (3) with respect to one another:

$$1 \geq \frac{p}{d_b} \geq 0.6 \tag{1}$$

$$1 \geq \frac{d_k}{d_b} \geq 1 - \frac{0.5}{d_b} \qquad (2)$$

$$d_a = -0.0277 \, (d_b)_2 + 1.491 \, d_b - 0.447 \qquad (3)$$

Figure 2:
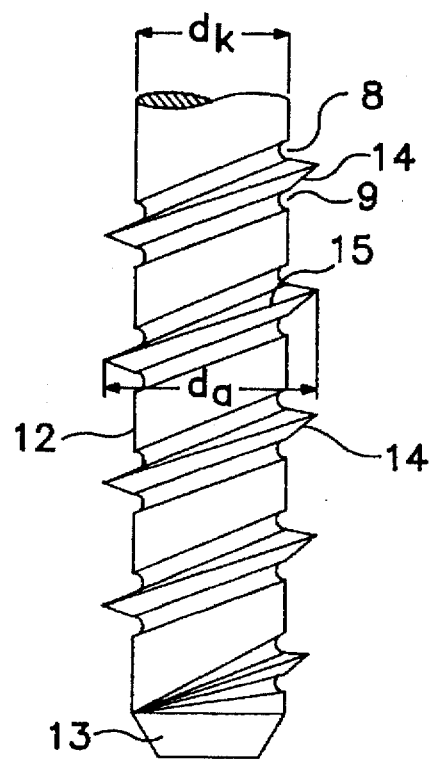
FIG. 2 shows a modified screw according to the invention.

These relationships and equations, respectively, apply also to the modification according to FIG. 2 in which like members are designated by the same reference numerals and will not be described again.

The only difference as compared to the embodiment illustrated in FIG. 1 is that continuous depressions 8, 9 are provided at either side of the thread 14 to receive the concrete or rock flour which is broken away. Hereby the introduction of the screw into concrete or masonry is facilitated additionally.

Figure 3:
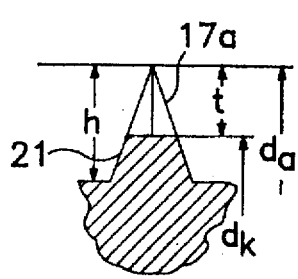
FIG. 3 is a part sectional view in the direction of the arrows III—III in FIG. 4.
Figure 4:
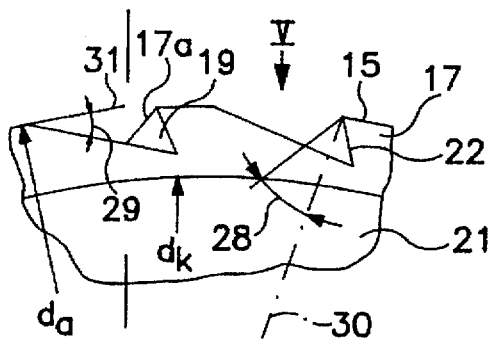
FIG. 4 is a part sectional view in a plane including the thread burr of a partial area of the thread.
Figure 5:
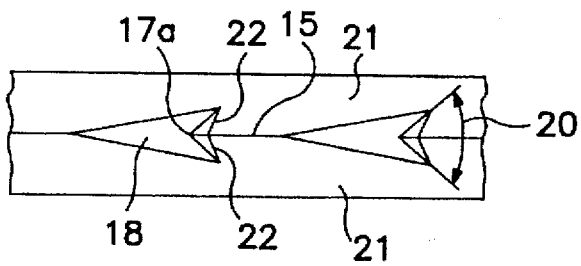
FIG. 5 is a partial view in the direction of the arrow V in FIG. 4 in a rolled out representation.

In the case of the embodiment shown in FIGS. 3 to 5 the thread burr 15 is interrupted at intervals by recesses 16 so that the burr portions which are left constitute cutting teeth 17 with a cutting edge 17a directed in the screw-in direction of the screw. The pitch of the cutting teeth is chosen, for instance, such that from six to thirty teeth per turn will result, depending on the diameter. The recesses 16 which interrupt the thread burr 15 are designed so that a planar surface 18 will be formed at the root of the recess, acting as a lock in the direction of unscrewing the scew. The cutting flanks 19 which define the cutting edge 17a intersect the thread flank faces 21 at an angle 20 of preferably 75° to 100°, more specifically at edges 22.

Figure 6:
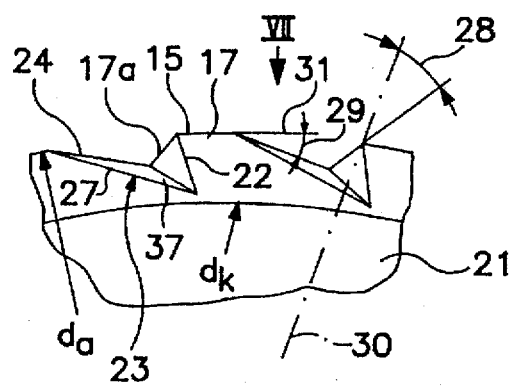
FIG. 6 is a part sectional view in a plane including the thread burr of a partial area of the thread of a modified screw according to the invention.
Figure 7:
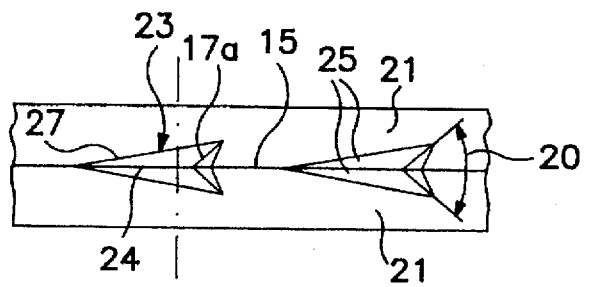
FIG. 7 is a view in the direction of the arrow VII in FIG. 6 in a rolled out representation.

FIGS. 6 and 7 show a modification which differs from the embodiment just described only in respect of the design of the bottom of the recesses 16. Thus, in the case of the modification the face presenting the bottom of the recesses 16 is not made to be a planar surface 18 but instead a wedge 23, with the wedge edge 24 passing over into the thread burr 15. The wedge faces 25 of the wedge 23 form an angle of preferably 60° to 100°, intersecting the thread flank faces 21 at the edges 27. As a consequence, on introducing the screw, the material detached by the cutting edges 17a can be removed more easily over the inclined faces 25 towards the thread bottom.

The depth of the recesses 16 forming the cutting teeth 17 preferably is between 5/7 and 7/7 of the thread height of the thread 14. The cutting edge 17a conveniently is to be set at a negative angle 28 with respect to the radial direction of between 25° and 35° in relation to the screw radius 30. The surface 18 or the wedge edge 24 preferably is at an angle 29 of from 20° to 32° with respect to the tangent 31. All the transitions of the faces intersecting the thread flank faces are to be designed so that no sharp edges will be formed which would impair the flow of material.

Figure 8:
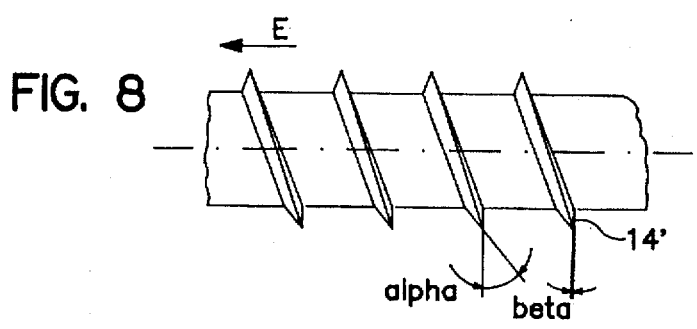
FIG. 8 is a partial view of a screw shank having a thread which is modified according to the invention, cuting teeth having been omitted from the drawing.

The embodiments according to FIGS. 8 to 11, on the one hand, and 12 to 14, on the other hand, illustrate modifications of the thread design. In both cases, as shown in FIG. 8, the angle of attack β of the thread flank 14' remote from the screw-in direction E, or facing the screw head, with respect to a plane perpendicular to the longitudinal screw axis is smaller than the angle of attack not designated in the figures of the thread flank 14" at the screw-in side. Preferably, this angle of attack β is between 2° and 5°. As a result, relative movements between the thread flank 14' and the concrete will not lead to abrasive action on the concrete in the event of cracks having formed in the concrete in the direction of the longitudinal screw axis and, therefore, any tendency of loosening and perhaps even extraction of the screw out of its hole in the concrete under load is counteracted.

Figure 9:
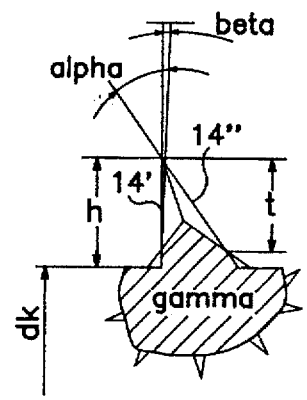
FIG. 9 is a part sectional view in the direction of the arrows IX—IX in FIG. 10 of the screw shank according to FIG. 8 having an asymmetric thread profile.
Figure 12:
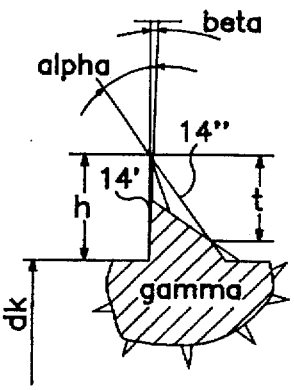
FIG. 12 is a part sectional view in the direction of the arrows XII—XII in FIG. 13 of the screw shank according to FIG. 8 with modified cutting teeth.

The different angular inclination of the two flanks 14', 14" provides an asymmetric thread profile, as clearly visualized in FIGS. 9 and 12.

Figure 10:
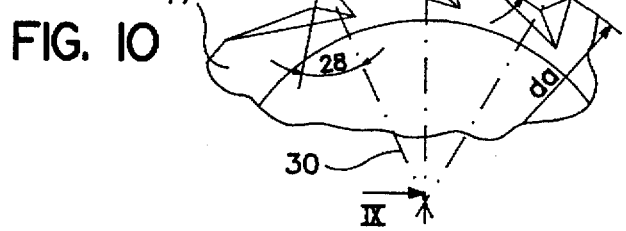
FIG. 10 is a part sectional view of the screw shank according to FIG. 8 in a plane which includes the thread burr.
Figure 11:
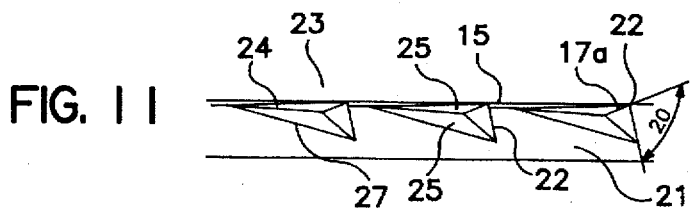
FIG. 11 is a rolled out partial view in the direction of the arrow XI in FIG. 10.
Figure 13:
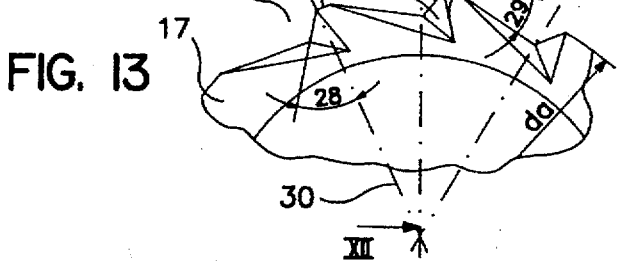
FIG. 13 is a part sectional view like FIG. 10 in a plane which includes the thread burr.
Figure 14:
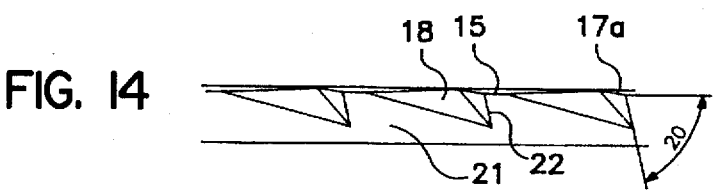
FIG. 14 is a rolled out partial view in the direction of the arrow XIV in FIG. 13.

Modifications of the cutting teeth result as well, the configuration according to FIGS. 9 to 11 corresponding in principle to the one illustrated in FIGS. 6 and 7, while the configuration of FIGS. 12 to 14 in principle corresponds to that of FIGS. 3 to 5. For this reason, the specific design of the cutting teeth will not be described again in detail, instead reference is made to the corresponding explanations given of FIGS. 3 to 7, and, for the sake of simplicity, the same reference numerals as in FIGS. 3 to 7 are used for both embodiments, the one according to FIGS. 9 to 11 and the one according to FIGS. 12 to 14.

It merely should be pointed out that the flank angle α is 40° in both embodiments, and that the angle gamma of the embodiment according to FIGS. 9 to 11 is 84°, whereas it is 65° in the case of the embodiment according to FIGS. 12 to 14. These values lie within the range of 60° to 100° mentioned above in connection with FIGS. 6 and 7. Also angles 28 and 29 of the embodiments shown in FIGS. 8 to 14 are within the ranges indicated above for FIGS. 3 to 7. Specifically, here the angle 28 has a value of 34° and the angle 29 has a value of 31°.

Finally, the angle 20 has a value of 98° in the embodiment according to FIGS. 9 to 11 and a value of 78° in the embodiment according to FIGS. 12 to 14 so that also this angle 20 lies within the range of from 75° to 100° specified above for the embodiment according to FIGS. 3 to 7.

Figure 15:
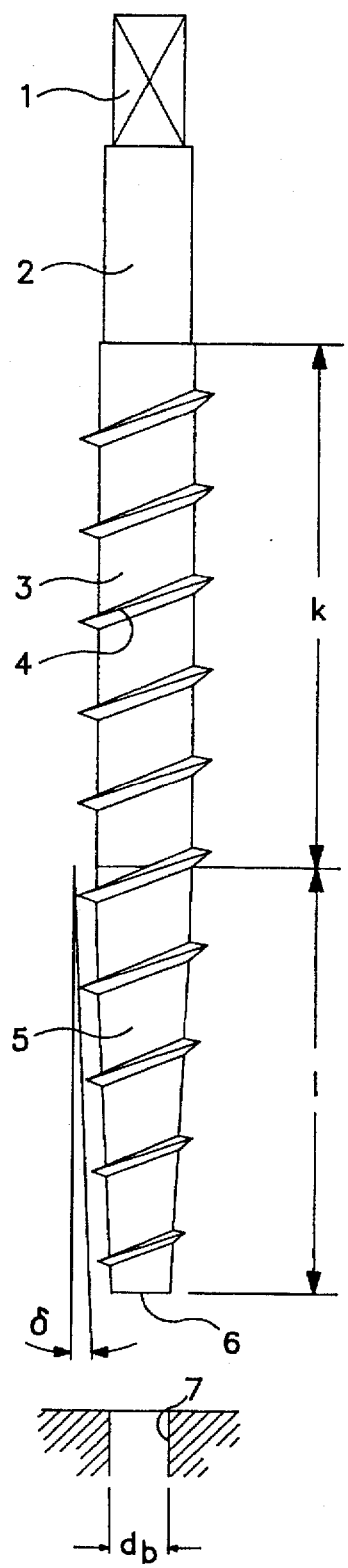
FIG. 15 shows a screw according to the invention designed as a thread drilling tool.

The screw presented in FIG. 15 is designed as a thread drilling tool to make a tapped hole in concrete, masonry, and the like. The tool has a clamping portion 1 which is quadrilateral or multisided in cross section and by which the tool may be clamped in a drill, next a smooth shank portion 2 circular in cross section, an adjacent guide portion 3 provided with a thread 4, and a thread lead portion 5 which is slightly conical, having a cone angle δ of between 1.5° and 3°, preferably about 2°, and on which the thread 4 continues up to the end face 6 of the tool.

In the tool illustrated, the length l of the thread lead portion 5 is to the length k of the guide portion 3 like approximately 4:5. This results from the small preferred cone angle δ=2° of the thread lead portion 5. It is important that the thread 4 start directly at the surface 6 of the tool facing the bore 7 in the concrete in order for the thread cutting process to be able to begin at once as the tool is sunk into the bore 7.

For the sake of simplicity, FIG. 15 does not show the cutting teeth which may be arranged around the thread burr as in the other embodiments and which were explained already with reference to FIGS. 3 to 14.

Thread drilling tools usually are made of metal. Thus the forming of the cutting teeth in the thread burr may be difficult. Alternatively, therefore, cutting teeth made by paraxial profile grooves and extending approximately for the thread height h of the thread 4 may be provided instead of the cutting teeth described. Such cutting teeth also may be provided together with the cutting teeth discussed above with reference to FIGS. 3 to 14.

As the tool is turned into a hole 7 predrilled in the concrete, the wedge-shaped teeth of the thread 4 are pressed into the concrete under great pressure. Due to the wedging effect of the teeth, local overstressing of the concrete occurs and that leads to the formation of fracture scars and finally to chipping off of the concrete. It is by this severing mechanism that the desired internal thread finally is formed in the concrete.

A screw provided with a thread according to FIGS. 1 to 14 then may be turned directly into the internal thread thus obtained and, without any meditation of a dowel, it will provide good fastening of parts to be held against the concrete or masonry. Such a screw, however, does not need any cutting teeth as described with reference to FIGS. 3 to 14 and designated 16.

We claim:

1. A thread forming screw for direct screwing into concrete, masonry, or the like, the thread (14; 4) of the screw extending at least partly over the length of the screw shank, wherein the ratio of external diameter ($d_a$) to core diameter ($d_K$) of the screw is from 1.25 to 1.5, the ratio of external diameter ($d_a$) to lead (p) of the thread (14; 4) is from 1.5 to 1.6, and the profile angle ($\alpha$) of the thread (14; 4) is smaller than 50° and greater than or equal to 35°.

2. The screw as claimed in claim 1, characterized in that the screw shank has depressions (8, 9) on either side of the thread base to take up rock flour which has broken away.

3. The screw of claim 2 in a predrilled bore (10), wherein the lead (p) with respect to the bore diameter ($d_b$) of the bore is: $1 \geq p/d_b \geq 0.6$.

4. The screw of claim 3 wherein the core diameter ($d_k$) of the screw with respect to the bore diameter ($d_b$) of the bore is: $1 \geq d_k/d_b \geq (1-0.5/d_b)$.

5. The screw of claim 4 wherein the external diameter ($d_a$) of the screw with respect to the bore diameter ($d_b$) of the bore is: $d_a = -0.0277 d_b^2 + 1.491 d_b - 0.447$.

6. The screw as claimed in claim 1 in a predrilled bore (10), characterized in that the lead (p) with respect to the bore diameter ($d_b$) of the bore (10) is as follows:

$$1 \geq \frac{p}{d_b} \geq 0.6.$$

7. The screw of claim 1 in a predrilled bore (10), characterized in that the core diameter ($d_k$) of the screw with respect to the bore diameter ($d_b$) of the bore (10) is as follows:

$$1 \geq \frac{d_k}{d_b} \geq 1 - \frac{0.5}{d_b}.$$

8. The screw of claim 1 in a predrilled bore (10), characterized in that the external diameter ($d_a$) of the screw with respect to the bore diameter ($d_b$) of the the bore (10) is as follows:

$$d_a = -0.0277 d_b^2 + 1.491 d_b - 0.447.$$

9. The screw of claim 1, characterized in that the thread burr (15) of the thread (14; 4) has bow-shaped cutting teeth (17).

10. The screw as claimed in claim 9, characterized in that the thread burr (15) of the thread (14) is interrupted at intervals by recesses (16), in that the burr portions remaining between the recesses (16) form the bow-shaped cutting teeth (17), and in that the cutting edges (17a) of the cutting teeth (17) essentially are directed in screw-in direction of the thread (14) and set at a negative angle (28) with respect to the radial direction (30).

11. The screw as claimed in claim 9, characterized in that from six to thirty cutting teeth (17) are provided per turn of the thread (14; 4).

12. The screw of claim 9, characterized in that the recesses (16) defining the cutting teeth (17) have a depth (t) which corresponds to from 5/7 to 7/7 of the thread height (h).

13. The screw of claim 10, characterized in that the negative angle (28) of the cutting edges (17a) of the cutting teeth (17) is from 25° to 35°.

14. The screw of claim 1 characterized in that a metric thread is provided instead of or as an extension to the screw head (11).

15. The screw of claim 14 wherein the angle of attack ($\beta$) of the thread flank (14') remote from the screw-in direction (E) with respect to a plane perpendicular to the longitudinal screw axis is smaller than the angle of attack of the thread flank (14") at the screw-in side and preferably lies between 2° and 5°.

16. The screw of claim 1, characterized in that the angle of attack ($\beta$) of the thread flank (14') remote from the screw-in direction (E) with respect to a plane perpendicular to the longitudinal screw axis is smaller than the angle of attack of the thread flank (14") at the screw-in side and preferably lies between 2° and 5°.

17. The screw of claim 1, characterized in that it is designed as a tool for producing an internal thread in concrete, rock, or the like, comprising a clamping portion (1), a shank portion (2), a constant diameter guide portion (3) which includes the thread (4), and a slightly conically formed thread lead portion (5).

18. A thread forming screw comprising:

a thread extending at least partly over a length of the screw's shank, wherein the ratio of external diameter ($d_a$) to core diameter ($d_k$) of the screw is from 1.25 to 1.5, the ratio of external diameter ($d_a$) to lead (p) of the thread is from 1.5 to 1.6, and the profile angle ($\alpha$) of said thread is smaller than 50° and greater than or equal to 35° ; and a thread burr of said thread having ship's bow-shaped cutting teeth with substantially straight cutting edges.

19. A thread forming screw comprising:

a thread extending at least partly over a length of the screw's shank, wherein the ratio of external diameter ($d_a$) to core diameter ($d_K$) of the screw is from 1.25 to 1.5, the ratio of external diameter ($d_a$) to lead (p) of the thread is from 1.5 to 1.6, and the profile angle ($\alpha$) of said thread is smaller than 50° and greater than or equal to 35°, wherein a first angle of attack of said thread's flank remote from a screw-in direction is smaller than a second angle of attack of said thread's flank in the screw-in direction, both said first and second angle of attack being relative to a plane perpendicular to a longitudinal screw axis.

20. The screw of claim 19 wherein said first angle of attack is from two to five degrees.

* * * * *